(12) United States Patent
Martel et al.

(10) Patent No.: US 10,605,288 B2
(45) Date of Patent: Mar. 31, 2020

(54) HIDDEN DECK FASTENER

(71) Applicant: OMG, Inc., Agawam, MA (US)

(72) Inventors: David Martel, Harwinton, CT (US);
Peter J. Shadwell, Longmeadow, MA (US)

(73) Assignee: OMG, Inc., Agawam, MA (US)

( * ) Notice: Subject to any disclaimer, the term of this patent is extended or adjusted under 35 U.S.C. 154(b) by 621 days.

(21) Appl. No.: 15/337,137

(22) Filed: Oct. 28, 2016

(65) Prior Publication Data

US 2017/0045069 A1    Feb. 16, 2017

Related U.S. Application Data

(63) Continuation of application No. 14/031,326, filed on Sep. 19, 2013, now abandoned, which is a
(Continued)

(51) Int. Cl.
*F16B 15/02* (2006.01)
*B25C 1/00* (2006.01)
(Continued)

(52) U.S. Cl.
CPC .............. *F16B 15/02* (2013.01); *B25C 1/001* (2013.01); *E04B 1/003* (2013.01); *E04F 15/02044* (2013.01); *E04F 15/02183* (2013.01); *F16B 5/002* (2013.01); *F16B 12/00* (2013.01); *F16B 12/20* (2013.01); *E04F 13/0826* (2013.01); *E04F 2015/02094* (2013.01); *E04F 2015/02122* (2013.01)

(58) Field of Classification Search
CPC .......... F16B 15/02; F16B 5/002; F16B 12/00; F16B 12/20; B25C 1/001; B04B 1/003; E04F 15/02044; E04F 15/02183; E04F 13/0826; E04F 2015/02094; E04F 2015/02122
USPC .......................................................... 52/410
See application file for complete search history.

(56) References Cited

U.S. PATENT DOCUMENTS

| 352,000 A | * | 11/1886 | Penfold | .................... | B65D 9/32 |
| | | | | | 292/316 |
| 1,714,738 A | * | 5/1929 | Smith | ..................... | E04F 15/04 |
| | | | | | 52/512 |

(Continued)

FOREIGN PATENT DOCUMENTS

GB          1271084 A      4/1972

*Primary Examiner* — Mark R Wendell
(74) *Attorney, Agent, or Firm* — Alix, Yale & Ristas, LLP

(57) ABSTRACT

A hidden fastener and associated method for attaching decking members with side grooves to a support member includes a cross member and an elongate anchoring member. The cross member has a body with a front and rear end and defines a hole. The front end has at least one prong and the rear end includes a bent wing. At least one leg extends downward from the body intermediate the front and rear ends. Each of the front and rear ends are configured to engage with the groove of adjacent decking members. The front end is inserted into the groove of a leading decking member and the anchoring member is driven through the hole into the support member. A trailing decking member is placed with the rear end in the groove adjacent the leading decking member.

18 Claims, 6 Drawing Sheets

Related U.S. Application Data continuation-in-part of application No. 13/169,175, filed on Jun. 27, 2011, now Pat. No. 8,555,570.

(60) Provisional application No. 61/358,676, filed on Jun. 25, 2010, provisional application No. 61/711,243, filed on Oct. 9, 2012, provisional application No. 61/779,071, filed on Mar. 13, 2013.

(51) Int. Cl.
| | |
|---|---|
| *E04F 15/02* | (2006.01) |
| *F16B 5/00* | (2006.01) |
| *F16B 12/20* | (2006.01) |
| *F16B 12/00* | (2006.01) |
| *E04B 1/00* | (2006.01) |
| *E04F 13/08* | (2006.01) |

(56) References Cited

U.S. PATENT DOCUMENTS

| | | |
|---|---|---|
| 2,849,715 A | 9/1958 | Kopf |
| 2,886,815 A | 5/1959 | Young |
| 2,946,060 A | 7/1960 | Powers |
| 3,181,662 A | 5/1965 | Maertzig, Jr. |
| 3,363,817 A | 1/1968 | Brack |
| 3,473,719 A | 10/1969 | Jephson |
| 3,633,810 A | 1/1972 | Krakauer et al. |
| 3,741,455 A | 6/1973 | Wandel et al. |
| 3,923,226 A | 12/1975 | Maier |
| 3,923,227 A | 12/1975 | Maier |
| 4,339,065 A | 7/1982 | Haytayan |
| 4,424,929 A | 1/1984 | Weis |
| 4,485,952 A | 12/1984 | Weis |
| 4,509,668 A | 4/1985 | Klaus et al. |
| 4,809,568 A | 3/1989 | DeCaro |
| 5,025,968 A | 6/1991 | Nasiatka |
| 5,042,142 A | 8/1991 | Beach et al. |
| 5,238,167 A | 8/1993 | Howard et al. |
| 5,378,102 A | 1/1995 | Mossman |
| 5,502,942 A | 4/1996 | Gras et al. |
| 5,642,597 A | 7/1997 | Hendrickson |
| 5,803,338 A | 9/1998 | Singer et al. |
| 6,142,352 A | 11/2000 | Larson et al. |
| 6,273,316 B1 | 8/2001 | Losada |
| 6,314,699 B1 | 11/2001 | West |
| 6,598,775 B1 | 7/2003 | Chen |
| 6,711,809 B1 | 3/2004 | Fischer et al. |
| 6,761,299 B2 | 7/2004 | Caringella et al. |
| 6,779,697 B2 | 8/2004 | Lin |
| 6,871,467 B2 | 3/2005 | Hafner |
| 6,908,022 B2 | 6/2005 | Schmitz |
| 6,932,261 B2 | 8/2005 | Huang |
| 7,052,200 B2 | 5/2006 | Harris |
| 7,111,767 B2 | 9/2006 | Losada |
| 7,287,681 B1 | 10/2007 | Wen |
| 7,546,717 B2 | 6/2009 | Juan Puerta |
| 7,739,807 B2 | 6/2010 | Grant |
| 7,805,902 B2 | 10/2010 | Martel |
| 7,882,994 B2 | 2/2011 | Francescon |
| 7,908,816 B2 | 3/2011 | Grafenauer et al. |
| 8,011,153 B2 | 9/2011 | Orchard |
| 8,146,303 B2 | 4/2012 | Gibson et al. |
| 8,161,702 B2 | 4/2012 | Eberle, III |
| 8,534,526 B2 | 9/2013 | Orchard |
| 9,822,809 B2 * | 11/2017 | Shadwell .......... E04F 15/02044 |
| 2002/0059766 A1 | 5/2002 | Gregori |
| 2003/0121226 A1 | 7/2003 | Bolduc |
| 2006/0059822 A1 * | 3/2006 | Guffey .................. E04F 15/02 52/480 |
| 2007/0234670 A1 | 10/2007 | Martel |
| 2007/0289249 A1 | 12/2007 | Martel |
| 2010/0181362 A1 | 7/2010 | Martel et al. |
| 2011/0067335 A1 * | 3/2011 | Gibson .................... E04B 5/12 52/489.2 |
| 2011/0197538 A1 | 8/2011 | Martel |
| 2011/0314765 A1 | 12/2011 | Martel |
| 2012/0110944 A1 * | 5/2012 | Hess ................. E04F 15/02044 52/582.1 |

\* cited by examiner

HIDDEN DECK FASTENER

CROSS REFERENCE TO RELATED APPLICATION

This application is a continuation of U.S. patent application Ser. No. 14/031,326 filed Sep. 19, 2013, which is a continuation-in-part of U.S. patent application Ser. No. 13/169,175 filed Jun. 27, 2011, which claims priority from U.S. Provisional Application No. 61/358,676 filed Jun. 25, 2010, and claims priority from U.S. Provisional Application No. 61/711,243, filed Oct. 9, 2012, and U.S. Provisional Application No. 61/779,071, filed Mar. 13, 2013, the entire disclosures of which are hereby incorporated by reference.

BACKGROUND OF THE DISCLOSURE

The disclosure relates to carpentry and, more particularly, to articles and methods for concealed attachment of grooved surface members to structural members.

Conventionally, deck planks or other sheathing members have been attached to joists or similar support members by a plurality of fixing or anchoring members, such as nails or screws, driven downward through the top of a plank, such as a wood or composite board, and into the top surface of a supporting beam, such as a joist or ledger board. Although the concept is simple, professional quality installation using this approach requires a high degree of precision, significant time expenditure, and sometimes leads to a flawed result. In particular, planks must be carefully aligned to achieve desirable aesthetic as well as functional results, for example, secure attachment and uniform spacing or parallelism with gaps of proper size for surface drainage and for appearance. Also, the insertion of the nails or screws must be performed carefully to ensure proper penetration of the joist, which will be concealed from view by the overlying wood board at the time of insertion, in order to achieve optimal attachment. This process is time consuming and requires some skill.

Even if the installation is performed properly, the securing member's penetration of the upper surface of the plank leaves the plank with a pock-marked appearance and prone to rot and weather damage, which severely decreases the longevity of the deck. In addition, the nail or screws may work loose and protrude from the upper surface of the planks, which poses a risk of injury to users of the deck. Penetration of the top of the plank decreases the integrity of the plank and thus the deck as a whole, and increases the risk of injury.

These and other problems have spurred on numerous advancements in the field. For instance, an improved deck plank fastening system includes fasteners that attach to a side surface of the plank and a top surface of the joist using nails or screws. Such designs facilitate uniform spacing or parallelism of planks by providing tabs or vertically oriented flanges that engage adjacent planks. The tabs facilitate installation by locating the points of penetration at more readily visible and accessible positions. The fasteners improve the longevity of the resulting deck by repositioning the point of penetration to the side of the plank, which is less prone to weathering. In addition, the tabs reduce the risk of injury to the user of the deck by hiding the nails or screws below the surface. Also, the hidden fasteners improve the aesthetic appeal of the deck.

Many other improvements and permutations have been conceived in this field, including the provision of deck planks with side grooves for receiving the teeth or tabs of hidden fasteners. Such improvements have specific advantages in specific circumstances, but have not foreclosed innovation in the field. For example, different sizes and types of grooved planks require distinct sizes and configurations of hidden fasteners. The broad variety of possible fasteners to be purchased can make installation of grooved planks both confusing and costly.

SUMMARY

Disclosed herein is a fastener for attaching decking members with side grooves to a support member. The fastener includes a cross member and an elongate anchoring member. The cross member has a body with a top and a bottom and opposite lateral edges extending between a front end and a rear end. The front end has at least one downwardly projecting prong and the second end is bent obliquely upward. The body defines an attachment hole extending from the top to the bottom. A pair of legs is each bent downward from opposite lateral edges of the body intermediate the front end and rear end. Each end of the cross member is configured to engage with the groove of an adjacent decking member. A portion of the anchoring member shank is configured to be driven through the cross member hole into the support member with the front end positioned within the groove of a leading decking member, forming a fastener and rigidly attaching a leading decking member to the support member by engagement between the cross member front end and the leading decking member groove. The legs are positioned between adjacent decking members.

In another embodiment, a fastener for attaching decking members with side grooves separating a top nub and a bottom nub to a support member has a cross member and an elongate anchoring member. The cross member has a body with a top and a bottom and opposite lateral edges extending between front and rear ends. The front end has at least one downwardly projecting prong and the second end is bent upward. The body defines an attachment hole extending from the top to the bottom. At least one leg projects from the body and has a terminal edge that is below the bottom of the body. The at least one leg defines a front abutment surface on the side of the leg that faces the direction of the body front end. Each end of the cross member is configured to engage the groove of an adjacent decking member and a portion of the anchoring member shank is configured to be driven through the cross member hole into the support member with the front end to rigidly attach a leading decking member to the support member by engagement between the cross member front end with the leading decking member groove with the front abutment surface of the at least one leg against the lower nub.

In yet another embodiment is disclosed a method of constructing a decking structure by attaching laterally adjacent planks with side grooves separating an upper nub from a lower nub to a support member with hidden fasteners. A cross member having a top and a bottom extending from a front to a rear end is provided. The rear end includes an oblique upward bend and the cross member defines an attachment opening intermediate the front end and rear end extending from the top to the bottom. At least one leg extends in the direction of the bottom. A leading decking plank is positioned substantially flat against the support member and the front end of the cross member is positioned within the groove of the leading decking plank. An elongate anchoring member is driven through the opening in the cross member into the support member with the at least one leg braced against the leading decking plank. The anchoring member and cross member collectively form a hidden fastener. A trailing decking plank is placed substantially flat against the support member adjacent the leading decking plank by inserting the trailing decking plank lower nub between the cross member and support member with the second end of the cross member within the groove of the trailing plank.

Other features and advantages of the disclosed fastener and method will become apparent in light of the detailed description as illustrated in the accompanying drawings.

DETAILED DESCRIPTION

Figure 1:
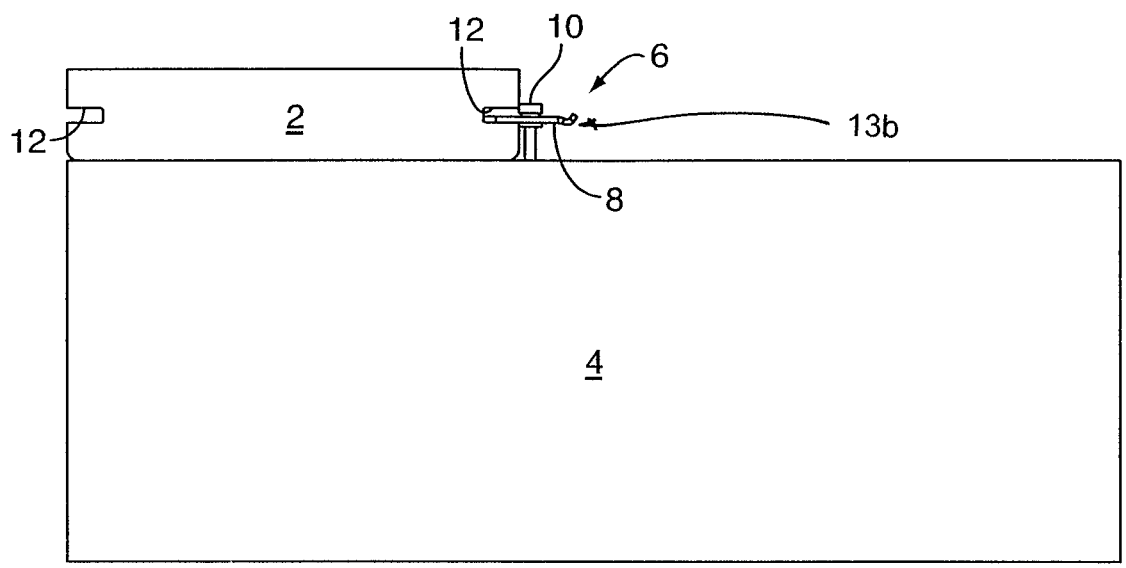
FIG. 1 shows in side view a hidden fastener attaching a sheathing member to a support member, according to an embodiment of the present invention.

Referring to FIG. 1, a sheathing member 2, such as for example a deck plank, is attached to a support member 4, such as for example a deck joist, by way of a hidden fastener 6. The hidden fastener includes a cross member 8, which has a first end 13a engaged into a groove 12 formed on the side of the deck plank 2. The hidden fastener also includes an anchoring member or fixing member 10, such as for example a nail or a ballistic screw, which is rigidly attached to the cross member 8 and holds the cross member 8 substantially parallel to the joist when installed. Preferably, the anchoring member 10 is attached to the cross member by a press fit formed when the anchoring member 10 is driven through the cross member 8. Accordingly, the second end 13b of the cross member 8 is supported at a fixed distance from the joist or support member, substantially of equal height with the first end of the cross member.

Figure 2:
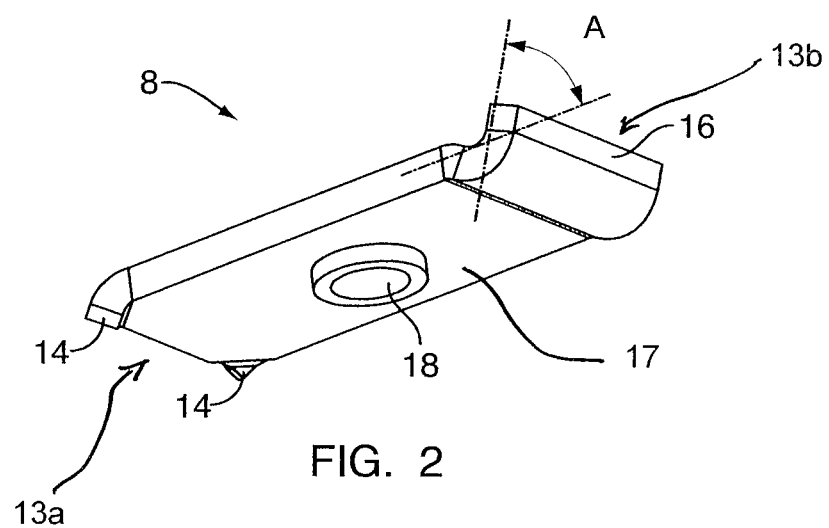
FIG. 2 shows in perspective view a first embodiment of a cross member for use in forming a hidden fastener, according to the present invention.

Referring to FIG. 2, the cross member 8 includes a first end 13a formed with downward-curving corners or claws 14 for gripping a lower side of the groove 12 formed in a previously-installed plank or sheathing member 2. The cross member also includes a second end 13b formed with an upward-curving wing 16 that provides for easier assembly of a subsequent plank or sheathing member 2 onto the already-installed cross member. Preferably, the wing 16 forms an angle A with the generally planar body 17 of the cross member 8, for optimal engagement of the subsequent plank onto the wing 16. Preferably the angle A is within a range of approximately 10° to approximately 90°; more preferably between 15° and 75°; more preferably between 30° and 60°. In the depicted preferred embodiment, the angle A is approximately 45°. As shown, this embodiment of cross member 8 also has a small dip proximate the apex of the body 13 and wing 16.

In this embodiment, the body 17 of the cross member 8 also includes a hole 18 configured for receiving the anchoring member 10 during installation of the fastener. Here, the hole 18 is downwardly sleeved. Preferably, the sleeved hole 18 is carefully dimensioned to provide a press fit on the anchoring member 10. For example, the sleeved hole 18 may be formed by sequential punch and draw steps to provide an inner diameter within press fit tolerances of a few thousandths of an inch. A press fit between the cross member 8 and the anchoring member 10 permits the anchoring member 10 to support the cross member 8 substantially parallel to the support member 4 after installation of the hidden fastener 6. This in turn allows quicker and more facile installation of a subsequent plank 2 onto the winged end 16 of the cross member 8.

Figure 3:
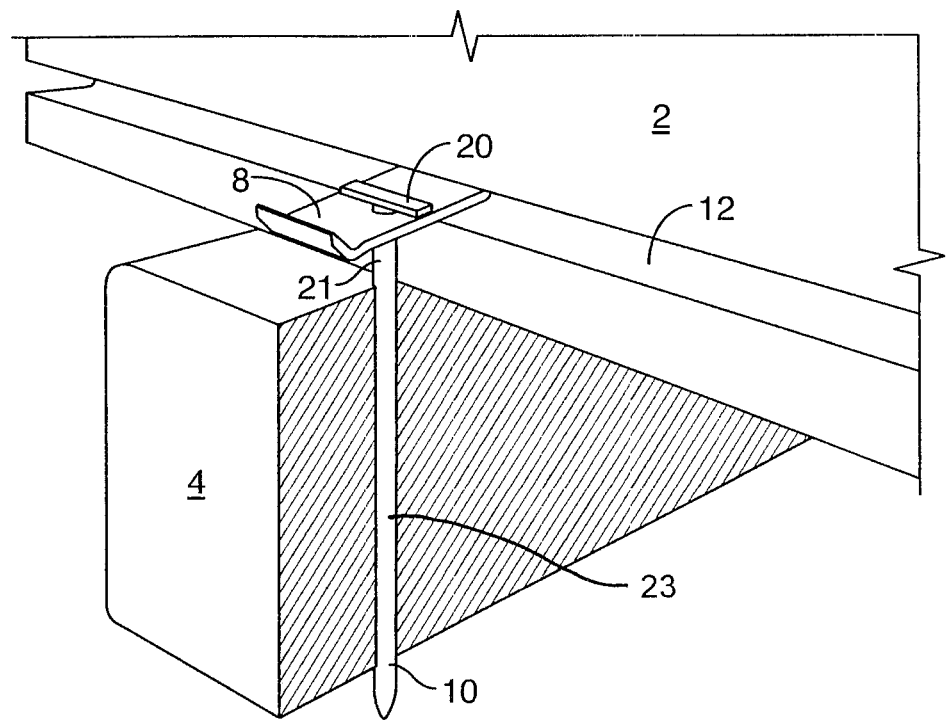
FIG. 3 shows in perspective a sectional view of the first embodiment of a hidden fastener attaching a sheathing member to a support member.

Referring to FIG. 3, the nail, ballistic screw, or other anchoring member 10 may be of a conventional shape. Preferably, the nail includes a T-head 20 sized to fit between adjoining deck boards such that no spacer other than the nail is needed in order to obtain adequate drainage from the upper surface of the deck. The anchoring member 10 also may include a collared portion 21, immediately below the T-head, for properly locating the press fit between the anchoring member 10 and the cross member 8. In one preferred embodiment, the collared portion 21 of the anchoring member 10 is the only portion that press fits to the sleeved hole 18 of the cross member, with the main shank 23 of the anchoring member 10 being sized to pass freely through the sleeved hole 18.

Figure 4:
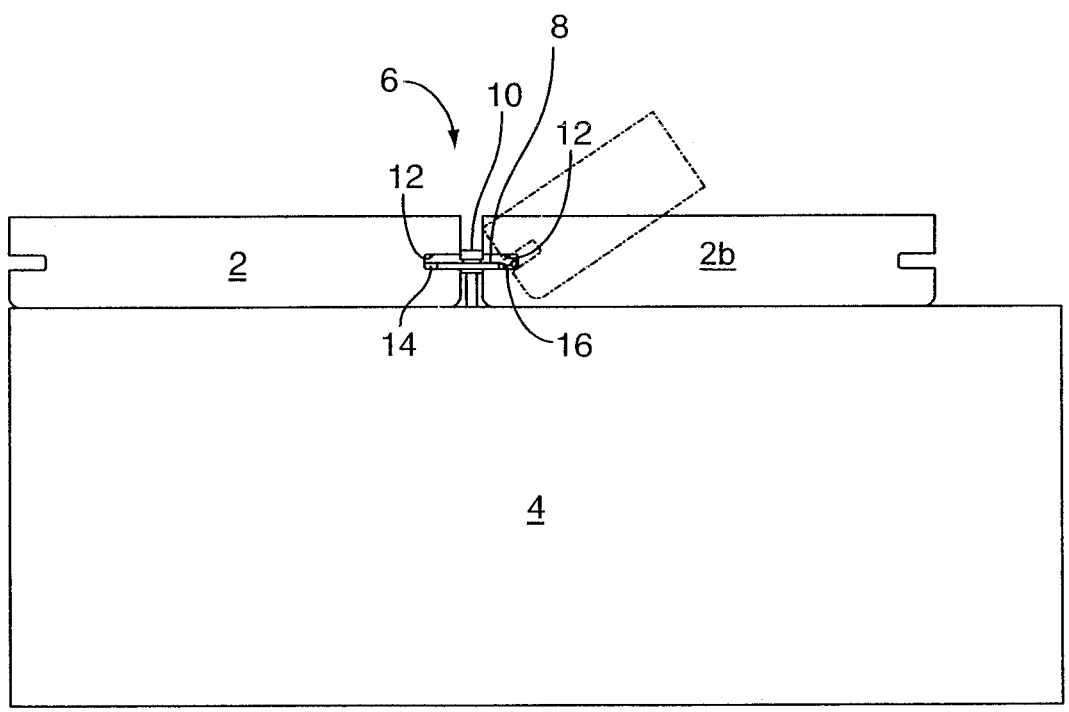
FIG. 4 shows in side view a subsequent sheathing member installed over the hidden fastener shown in FIGS. 1-3.

Referring now to FIG. 4, when rigidly supported by the anchoring member 10, the cross member 8 is well positioned for installation of a subsequent sheathing member or deck plank 2b onto the winged end 16 of the cross member 8. As will be appreciated from the phantom lines in FIG. 4, the subsequent sheathing member 2b first is engaged with the winged end 13b of the cross member 8 at an angle to the joist 4, then is rotated downward onto the joist to fully engage the winged end 16 of the cross member 8 into one of the side grooves 12.

Figure 5:
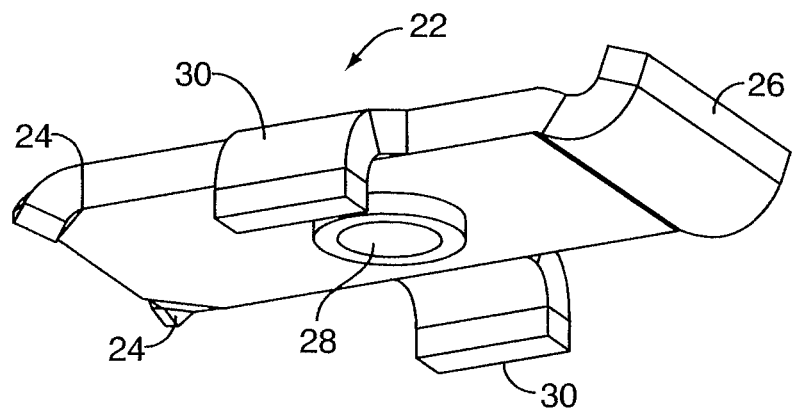
FIG. 5 shows in perspective view a second embodiment of a cross member for use in forming a hidden fastener, according to the present invention.

Referring to FIG. 5, an additional embodiment of a cross member 22 also is suitable for use in forming the hidden fastener 6. Like the previous embodiment, this cross member 22 includes a first end with downward-curving claws 24, an opposing second end with an upwardly curved wing 26, and a sleeved hole 28 for receiving an anchoring member 10. The cross member 22 also includes at least one downwardly bent spacer legs 30, which extend outward from lateral edges of the cross member 22. As shown in FIG. 5, this embodiment has two spacer legs 30 positioned to extend from opposite lateral edges of the cross member 22.

Figure 6:
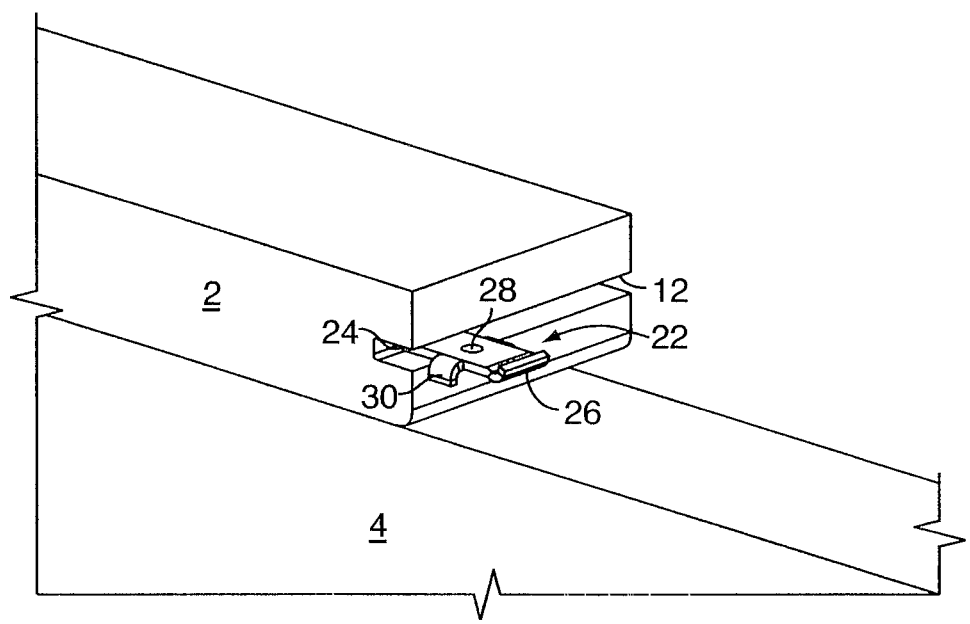
FIG. 6 shows in perspective view the second embodiment of a cross member shown in FIG. 5, positioned for attaching a sheathing member to a support member.

Referring to FIG. 6, the spacer legs 30 can be employed for at least two reasons. First, the legs 30 serve to space a subsequent plank (not depicted) from a plank 2 previously attached to a joist 4 by means of the hidden fastener 6. Secondly, the legs 30 serve to brace the cross member 22 against the side of a plank 2 with which the claws 24 are engaged, so that the cross member 8 extends from the plank substantially parallel to the underlying joist, for enhanced ease of installing the subsequent plank (not depicted). A cross member, 8 or 22, and/or legs 30 may cooperate with a positive stopper mechanism within a front end of an automatic feeding system of an installation tool (discussed below) to aid in alignment of the cross member 22 prior to installation via a driven securing member 10. In other embodiments, the spacer legs may be configured to be driven partially into the support member during installation.

Figure 7:
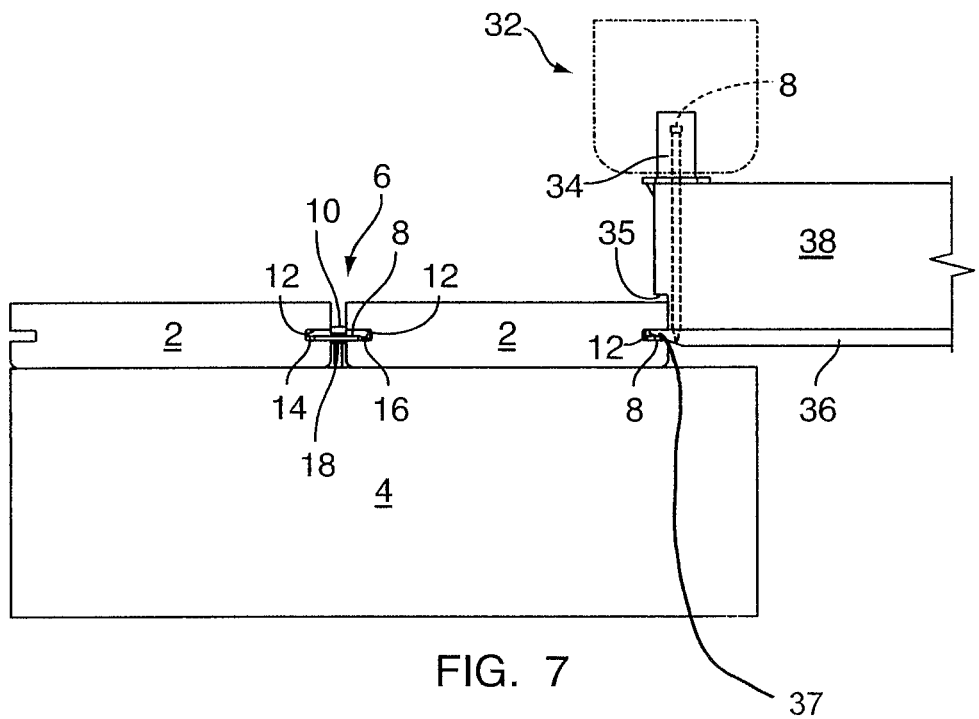
FIG. 7 shows in side view a subsequent hidden fastener being installed and formed to attach the subsequent sheathing member to the support member shown in FIG. 2.
Figure 8:
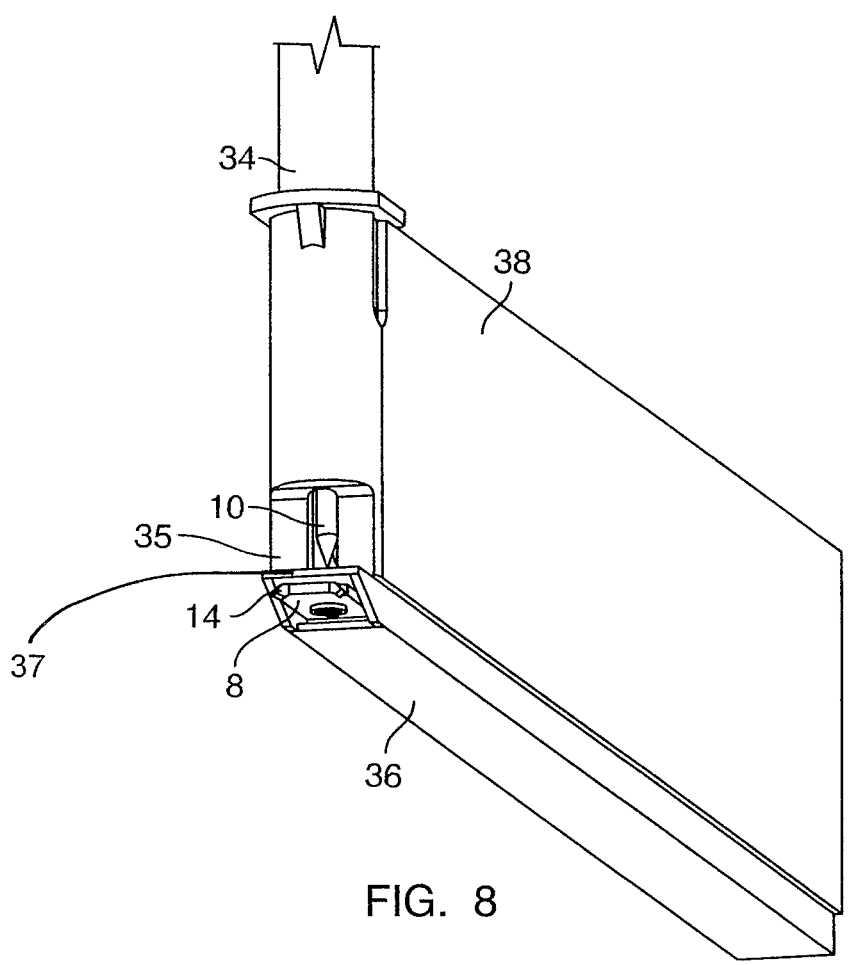
FIG. 8 shows in perspective view a custom barrel and magazines for use with a conventional power driving tool for installing and forming the inventive hidden fastener.

Referring to FIG. 7, the hidden fastener 6 can be installed by means of a power driving tool 32, shown in phantom lines, specially configured for installing the hidden fastener 6. For example, as shown in FIG. 8, a pneumatic or combustion-powered nail driver may be used with substitution of a suitable barrel 34 including a notch 35, a generally flat first feeding mechanism 36 (here, a magazine), and a second feeding mechanism 38 (a nail magazine). Alternatively, one or both feeding mechanisms and the barrel may be formed integrally with the power driving tool. Here, the notch 35 of the barrel 34 permits the cross member 8 to be held by the driving tool 32 while being fully inserted into one of the grooves 12 formed on a deck plank 2, as shown in FIG. 7. The notch 35 also permits an upper nose or point 37 of the flat magazine 36 to be engaged into the groove 12, so that the gun 32 and magazine 36 are held substantially parallel to the joist 4. As noted above, the power driving tool may include a positive stopper mechanism for aiding alignment of the fixing member and cross member prior to installation.

Referring also to FIG. 8, the notch 35 also exposes a portion of the most forward anchoring member 10 in the second feeding mechanism 38 so that the anchoring member 10 can be positioned directly adjacent the plank 2 to provide proper spacing between adjacent planks. Still referring to FIGS. 7 and 8, in some embodiments the first and second feeding mechanisms 36 and 38 are provided integrally with the barrel 34 to provide for quick adaptation of a standard nail driver to other uses. In some embodiments the nail driver also includes a push feed mechanism 54 (shown in FIG. 9) that is customized for installation of the inventive hidden fasteners 6.

Figure 9:
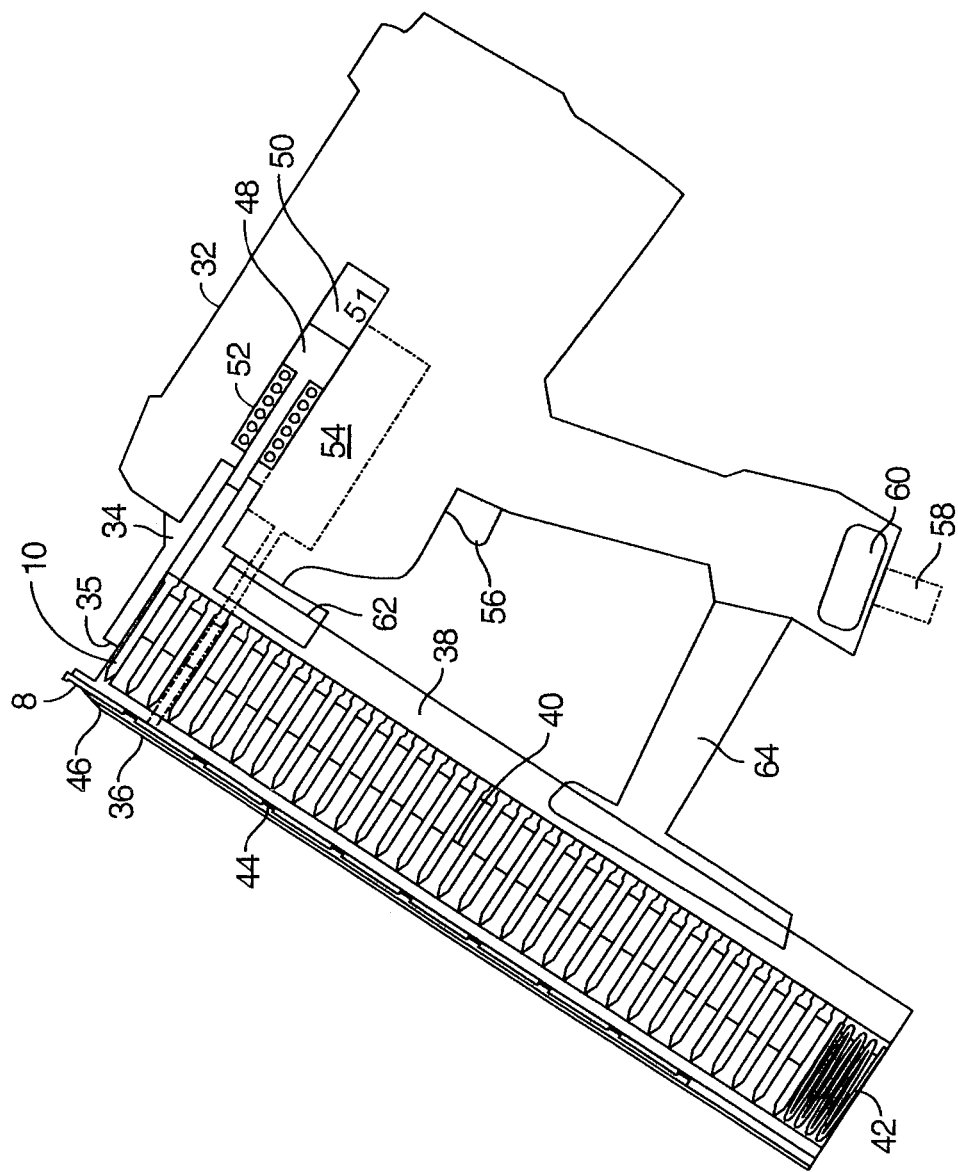
FIG. 9 shows in side schematic view an exemplary power driving tool for installing and forming the hidden fasteners shown in FIGS. 1-3.
Figure 10:
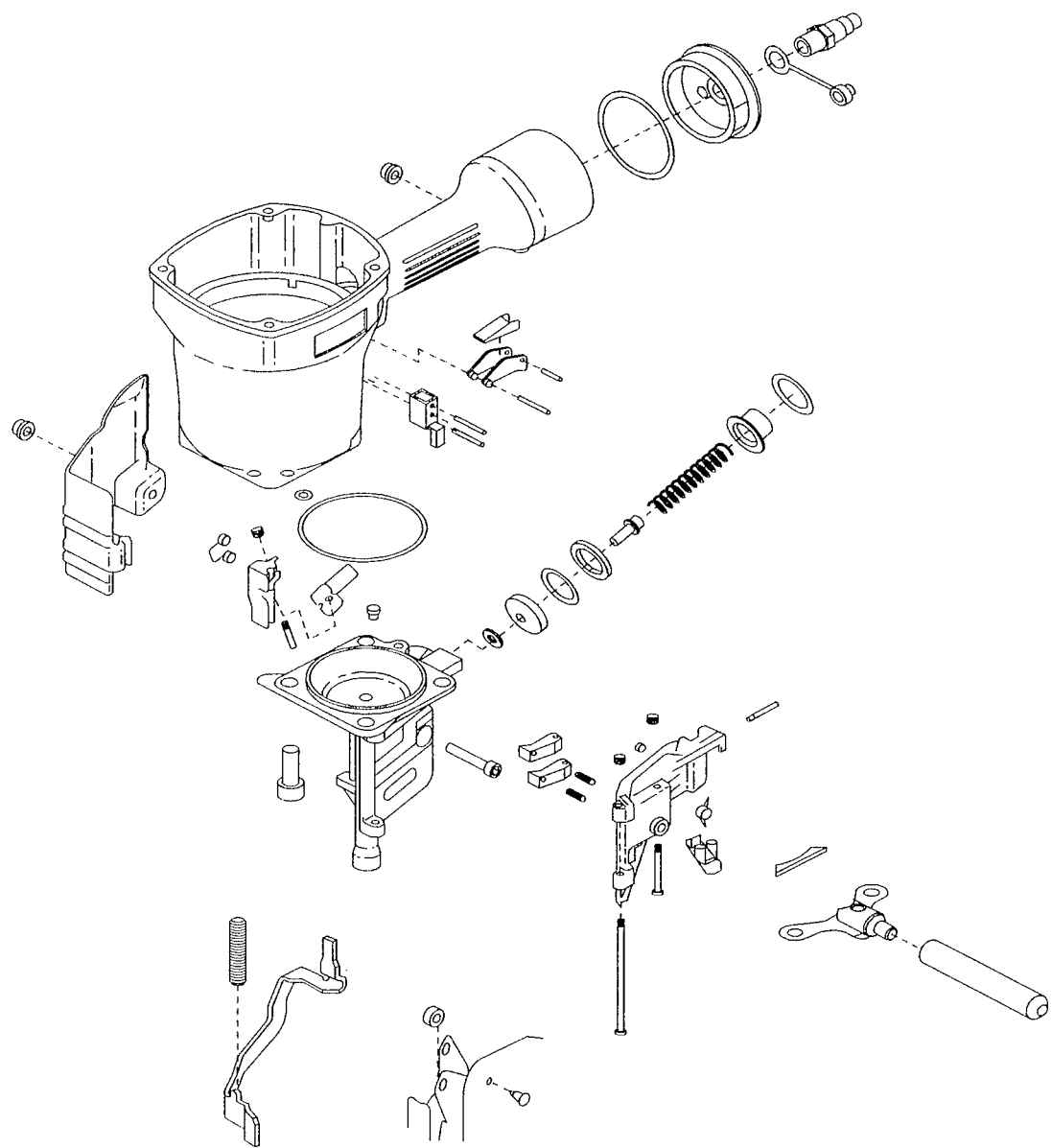
FIG. 10 shows in perspective view an exploded assembly of a conventional power driving tool.

Referring now to FIG. 9, an exemplary power driving tool 32 for use in attaching the disclosed hidden fasteners 6 is shown in schematic outline with key components partly sketched. The barrel 34 and the first and second feeding mechanisms 36 and 38 are sectioned to show a strip of cross members 8 and a stick of anchoring members 10. In one preferred embodiment, the stick of anchoring members 10 are collated by a wire 40 and are sequentially push-fed into the barrel 34 by a leaf spring 42. As will be understood, each actuation of the driver 32 makes room for a next anchoring member 10 to be fed from the second feeding mechanism 38 into the barrel 34. The strip of cross members 8 can be collated on a tape 44, and can be fed from the first feeding mechanism 36 at least by the pulling action of removing the driver 32 from an already-installed hidden fastener 6, or by a push feed mechanism. The flat magazine 36 includes a lip or brace 46 for supporting the winged end 16 or 26 of each cross member 8 or 22 during firing of a corresponding anchoring member.

In addition to the barrel 34 and the feeding mechanisms 36, 38, the depicted embodiment of power driving tool 32 also includes a hammer 48, which reciprocates within a chamber 50 by means of a spring 52 on a barrel side of the hammer piston and a propulsion fluid 51 on a chamber side of the hammer piston. The tool also may include a push feed mechanism 54, as discussed above and shown in FIG. 9 by phantom lines. As known, the nail driver is actuated by a trigger 56 and may be powered at least by compressed air provided through an inlet fitting 58, or by combustion of butane or other gas provided from a removable flask 60. The feeding mechanisms 36, 38 can be attached to the driver 32 by way of top and bottom braces, 44 and 46, respectively, or a like means of attachment, or formed integrally with the body of the tool.

In operation, in preparation for installation and in situ forming of the inventive hidden fastener 6, the tool 32 is used to position the clawed first end 14 or 24 of a cross member 8 or 22 into a groove 12 of a deck plank 2 resting on a joist 4. During installation and forming of the hidden fastener 6, the nose or point 37 of the flat first feeding mechanism 36 is engaged into the groove 12 of the plank, and/or one of the top or bottom braces 62, 64 may contact the joist 4 and support the tool 32 with the feeding mechanism 36 substantially parallel to the joist 4, while the lip 46 formed in the flat magazine 36 supports the winged end 16 or 26 of the cross member 8 or 22 substantially parallel to the joist 4. Actuating the tool 32 via the trigger 56 causes the hammer 48 to drive an anchoring member 10 through the sleeved hole 18 of the cross member 8 or 22 and into the joist 4. The collared portion 21 of the anchoring member forms a press fit with the sleeved hole 18 or 28, thereby rigidly attaching the cross member, anchoring member, joist, and plank. A subsequent plank then can be assembled over the winged end 16 or 26 of the cross member 8 or 22, as shown in FIG. 4. Another fastener can then be attached to the free end of the subsequent plank, and the process repeated as necessary.

A benefit of the disclosed fastener, method and tool is that they allow various types and sizes of side-grooved sheathing members to be securely yet invisibly attached to underlying support members. Additionally, the secure and hidden attachment can be accomplished for any type of side-grooved sheathing member using identical cross members and anchoring members in combination with a power driving tool specially configured for use with the fasteners, like the disclosed driver. Thus, the disclosed embodiments permit bulk manufacturing and purchasing of a single hidden fastener model for use with many different models of side-grooved deck planking.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A fastener for attaching decking members with side grooves to a support member, comprising:
   a cross member with a body having a top and a bottom and opposite lateral edges extending between front and rear ends, the front end having at least two downwardly projecting prongs, the body defining an attachment hole extending from the top to the bottom;
   a pair of legs intermediate the front end and rear end, each leg being bent downward from an opposite lateral edge;
   an elongate anchoring member comprising a head and a shank, wherein
   each end of the cross member is configured to engage the groove of an adjacent decking member and a portion of the anchoring member shank is configured to be driven through the cross member hole into the support member with the front end positioned within a leading decking member groove to form a fastener and rigidly attach the leading decking member to the support member by engagement between the cross member front end with the leading decking member groove, the legs being positioned between the adjacent decking members.

2. The fastener of claim 1, wherein the attachment hole is further defined by at least one surface that projects from the body.

3. The fastener of claim 2, wherein the legs are substantially opposing one another on opposite lateral edges of the body.

4. The fastener of claim 1, wherein the at least one downwardly projecting prong is formed as a bend in a corner of the body at the front end.

5. The fastener of claim 1, wherein the rear end of the body terminates in a rear edge and includes a compound bend defining a lower vertex intermediate the attachment opening and rear edge.

6. The fastener of claim 5, wherein a middle portion of the body is substantially flat and defines a longitudinal plane and the lower vertex lies below the plane.

7. The fastener of claim 6, wherein the rear edge lies above the plane.

8. The fastener of claim 1, wherein the at least legs extend outward from the respective lateral edges of the body.

9. A fastener for attaching decking members with side grooves separating a top nub and a bottom nub to a support member, comprising:
   a cross member with a body having a top and a bottom and opposite lateral edges extending between front and rear ends, the front end having at least one downwardly projecting prong, the body having a flat central section defining a plane with an attachment hole extending from the top to the bottom;
   at least one leg projecting laterally out from the body and having a terminal edge that lies outside the plane defined by the flat central section of the body, the at least one leg defining a front abutment surface on the side of the leg that faces the direction of the body front end;
   an elongate anchoring member comprising a head and a shank, wherein
   each end of the cross member is configured to engage the groove of an adjacent decking member and a portion of the anchoring member shank is configured to be driven through the cross member hole into the support member to rigidly attach a leading decking member to the support member by engagement between the cross member front end with the leading decking member groove with the front abutment surface of the at least one leg against the lower nub.

10. The fastener of claim 9, comprising two legs, each leg extending from an opposite lateral edge of the cross member body.

11. The fastener of claim 10, wherein the legs oppose one another on opposite edges and are substantially equidistant from the front end, and the front abutment surface of both legs are against the lower nub.

12. The fastener of claim 9, wherein the attachment hole is further defined by at least one surface that projects from the body.

13. The fastener of claim 9, wherein the rear end of the body terminates in a rear edge, the rear end including a compound bend defining a lower vertex intermediate the attachment opening and rear edge.

14. The fastener of claim 9, wherein the rear edge lies above the plane defined by the flat central section of the body.

15. A method of constructing a decking structure by attaching laterally adjacent decking planks having side grooves separating an upper nub from a lower nub to a support member by engagement with hidden fasteners, comprising:
   providing a cross member having a top and a bottom extending from a front end with at least two downwardly projecting prongs to a rear end, the cross member defining an attachment opening intermediate the front end and rear end extending from the top to the bottom, and at least one leg extending downwardly from the body;
   positioning a leading decking plank substantially flat against the support member;
   positioning the front end of the cross member within the groove of the leading decking plank;
   driving an elongate anchoring member through the opening in the cross member into the support member with the at least one leg braced against the leading decking plank, the anchoring member and cross member collectively forming a hidden fastener; and
   placing a trailing decking plank substantially flat against the support member adjacent the leading decking plank by inserting the trailing decking plank lower nub between the cross member and support member with the second end of the cross member within the groove of the trailing plank and the lower nub against the leg.

16. The method of claim 15, wherein the cross member includes a leg extending from each lateral edge of the body.

17. The method of claim 16, wherein both legs are braced against the leading decking plank during the step of driving an elongate anchoring member.

18. A fastener for attaching decking members with side grooves to a support member, comprising:
   a cross member with a body having a top and a bottom and opposite lateral edges extending between front and rear ends, the front end having two downwardly projecting prongs, the body defining an attachment hole extending from the top to the bottom;
   a pair of legs intermediate the front end and rear end, each leg being bent downward from an opposite lateral edge;
   an elongate anchoring member comprising a head and a shank, wherein
   at least one of the legs extends outward from the respective lateral edge of the body, and
   each end of the cross member is configured to engage the groove of an adjacent decking member and a portion of the anchoring member shank is configured to be driven through the cross member hole into the support member with the front end positioned within a leading decking member groove to form a fastener and rigidly attach the leading decking member to the support member by engagement between the cross member front end with the leading decking member groove, the legs being positioned between the adjacent decking members.

* * * * *